(12) United States Patent
Chameroy et al.

(10) Patent No.: US 10,448,777 B2
(45) Date of Patent: Oct. 22, 2019

(54) BAYONET-FITTING PRESSURE COOKER PROVIDED WITH A VESSEL HANDLE

(71) Applicant: SEB S.A., Ecully (FR)

(72) Inventors: Eric Chameroy, Veronnes (FR); Guillaume Julien, Selongey (FR)

(73) Assignee: SEB S.A., Ecully (FR)

( * ) Notice: Subject to any disclaimer, the term of this patent is extended or adjusted under 35 U.S.C. 154(b) by 731 days.

(21) Appl. No.: 15/171,976

(22) Filed: Jun. 2, 2016

(65) Prior Publication Data

US 2016/0353913 A1   Dec. 8, 2016

(30) Foreign Application Priority Data

Jun. 2, 2015   (FR) ..................................... 15 55000

(51) Int. Cl.
    *A47J 27/08*   (2006.01)
    *A47J 27/09*   (2006.01)
(52) U.S. Cl.
    CPC ........... *A47J 27/0806* (2013.01); *A47J 27/09* (2013.01)
(58) Field of Classification Search
    CPC ...... A47J 27/09; A47J 27/0806; A47J 27/092; A47J 27/0813
    See application file for complete search history.

(56) References Cited

U.S. PATENT DOCUMENTS

| | | |
|---|---|---|
| 2,583,085 A | 1/1952 | Campbell |
| 2,600,703 A | 6/1952 | Strom |
| 2,660,330 A * | 11/1953 | Keller ................. A47J 27/0806 220/298 |
| 3,653,533 A | 4/1972 | Mortensen |
| 3,876,385 A | 4/1975 | Markus |
| 4,276,990 A | 7/1981 | Chiodo |

(Continued)

FOREIGN PATENT DOCUMENTS

| | | |
|---|---|---|
| BR | 8601076 A | 10/1987 |
| CH | 571335 A5 | 1/1976 |

(Continued)

OTHER PUBLICATIONS

Search Report and Written Opinion issued by Institut National de la Propriété Industrielle, for French Patent Application No. 1552579, dated Feb. 2, 2016, 8 pages.

(Continued)

*Primary Examiner* — Dana Ross
*Assistant Examiner* — Lawrence H Samuels
(74) *Attorney, Agent, or Firm* — Loeb & Loeb LLP (57) ABSTRACT

The invention provides a bayonet-fitting pressure-cooking utensil having a vessel and a lid, said utensil including a support attached to said lid so that said lid can pivot relative to said support, the support and the vessel being configured to be united in a predetermined relative arrangement enabling the lid to be locked to the vessel, said support forming a first positioning element that projects radially beyond the lid and that is designed such that, when the support and the vessel are united in said predetermined relative arrangement, said first positioning element interacts mechanically with a second positioning element to lock the relative angular positioning of the support and of the vessel, while also allowing said handle to project radially outwards beyond said support.

18 Claims, 7 Drawing Sheets

(56) References Cited

U.S. PATENT DOCUMENTS

| | | | | |
|---|---|---|---|---|
| 5,310,981 | A | * | 5/1994 | Sarnoff .............. A47J 27/088 126/369 |
| 5,768,976 | A | | 6/1998 | Suk |
| 6,425,320 | B1 | | 7/2002 | Chameroy |
| 6,450,361 | B1 | * | 9/2002 | Mendelson .......... A47J 27/0811 220/202 |
| 6,523,459 | B1 | * | 2/2003 | Chameroy .............. A47J 27/09 220/316 |
| 7,565,862 | B2 | * | 7/2009 | Cartigny .............. A47J 27/0813 220/314 |
| 7,669,521 | B2 | * | 3/2010 | Cartigny .............. A47J 27/0813 220/314 |
| 2003/0010216 | A1 | * | 1/2003 | Yang ................ A47J 27/0802 99/337 |
| 2005/0178274 | A1 | * | 8/2005 | Cartigny .............. A47J 27/0813 99/337 |
| 2005/0284305 | A1 | * | 12/2005 | Angue ................ A47J 27/0808 99/337 |
| 2008/0290092 | A1 | * | 11/2008 | de Bastos Reis Portugal ............. A47J 27/0813 220/321 |
| 2009/0020020 | A1 | * | 1/2009 | Rhetat ................ A47J 27/0804 99/337 |
| 2009/0026200 | A1 | * | 1/2009 | Milanesi ............. A47J 27/0808 220/203.01 |
| 2012/0000909 | A1 | * | 1/2012 | Chameroy .......... A47J 27/0813 220/324 |
| 2012/0012584 | A1 | * | 1/2012 | Chameroy .......... A47J 27/0813 220/203.01 |
| 2013/0104875 | A1 | * | 5/2013 | Schultz .............. A47J 27/0813 126/377.1 |
| 2014/0305947 | A1 | * | 10/2014 | Lee ........................ A47J 36/06 220/573.1 |
| 2014/0339223 | A1 | * | 11/2014 | Backaert ............... A47J 36/027 219/732 |
| 2014/0360384 | A1 | * | 12/2014 | Kim ................... A47J 27/0806 99/403 |

FOREIGN PATENT DOCUMENTS

| | | |
|---|---|---|
| CH | 694356 A5 | 12/2004 |
| CN | 2389593 Y | 8/2000 |
| CN | 2469839 Y | 1/2002 |
| CN | 201624512 U | 11/2010 |
| CN | 102166092 B | 8/2011 |
| CN | 203000535 U | 6/2013 |
| CN | 102349791 B | 4/2014 |
| DE | 3703448 A1 | 8/1988 |
| DE | 29508504 U1 | 9/1995 |
| EP | 0743036 A1 | 11/1996 |
| EP | 2258243 | 12/2004 |
| EP | 2732736 A1 | 5/2014 |
| FR | 2782257 A1 | 2/2000 |
| FR | 2783687 A1 | 3/2000 |
| GB | 641540 A | 8/1950 |
| GB | 657982 A | 10/1951 |
| JP | S5898018 U | 7/1983 |
| WO | 0143605 A1 | 6/2001 |
| WO | 2013039332 A2 | 3/2013 |

OTHER PUBLICATIONS

Search Report and Written Opinion issued by Institut National de la Propriété Industrielle, for French Patent Application No. 1554997, dated Mar. 31, 2016, 6 pages.

Search Report and Written Opinion issued by Institut National de la Propriété Industrielle, for French Patent Application No. 1555000, dated Mar. 22, 2016, 6 pages.

Search Report and Written Opinion issued by Institut National de la Propriété Industrielle, for French Patent Application No. 1555001, dated Mar. 22, 2016, 6 pages.

Search Report and Written Opinion issued by Institut National de la Propriété Industrielle, for French Patent Application No. 1554999, dated Mar. 22, 2016, 6 pages.

Office Action dated May 7, 2018 for U.S. Appl. No. 15/172,048 (pp. 1-7).

Notice of Allowance dated May 23, 2018 for U.S. Appl. No. 15/172,054 (pp. 1-5).

International Searching Authority, International Search Report, International Application No. PCT/FR2015/050786, dated Jul. 10, 2015, 7 pages.

International Searching Authority, Written Opinion, international Application No. PCT/FR2015/050786, dated Oct. 1, 2015, 5 pages.

International Searching Authority, Written Opinion, in International Application No. PCT/FR2015/050786, dated Oct. 1, 2015, 10 pages.

Search Report issued by Institut National de la Propriete Industrielle, for French Patent Application No. 1653140, dated Nov. 23, 2016, 2 pages.

Office Action dated Aug. 13, 2018 for U.S. Appl. No. 15/081,303 (pp. 1-9).

* cited by examiner

BAYONET-FITTING PRESSURE COOKER PROVIDED WITH A VESSEL HANDLE

CROSS-REFERENCES TO RELATED APPLICATIONS

This application claims priority to, and the benefit of, French Patent Application No. FR-15 55000, filed Jun. 2, 2015, entitled "A Bayonet Fitting Pressure Cooker Provided With A Vessel Handle," the entire contents of which is incorporated herein by reference.

BACKGROUND

The present invention relates to the general technical field of utensils for cooking food under pressure, and in particular to household utensils of the pressure cooker type that are designed to form cooking enclosures capable of allowing pressure to build up in them so as to cook food contained in them under steam pressure.

SUMMARY OF THE INVENTION

The present invention relates more particularly to a cooking utensil for cooking food under pressure that has a vessel that is provided with a handle, a lid that is independent of the vessel, and a locking system that has bayonet-fittings.

Cooking utensils for cooking food under pressure, in particular for household use, are well known. They generally comprise a metal vessel onto which a lid that is also made of metal is designed to be mounted in sealed manner, via a flexible annular seal, in such manner as to constitute a cooking enclosure capable of allowing pressure to build up in it. The lid is designed to be coupled to the vessel via locking means enabling the pressure cooker to go between a locked configuration, in which the lid is locked relative to the vessel, and in which the cooking enclosure is capable of allowing pressure to build up in it, and an unlocked configuration, in which the lid can be freely separated from the vessel. Different types of locking means are well known in the prior art. One of the systems that are in most widespread use is the locking system having bayonet fittings, that system being based on implementing vessel and lid ramps that are designed to come into mutual sliding abutment once the lid has been turned so as to provide a retaining mechanical coupling that prevents the vessel and the lid from coming apart under the effect of the build-up of pressure. The lid ramps are conventionally formed by locally and inwardly folding over the annular dropped edge of the lid, while the vessel ramps are obtained by folding over and cutting out the free top edge of the vessel.

Such a locking system having bayonet fittings is generally satisfactory, in particular because it is relatively light in weight, it is simple to manufacture, and it is reliable. However, it also suffers from certain significant drawbacks, in particular in terms of practicality and ergonomics.

Firstly, the very principle of locking by bayonet fittings requires the user to place the lid on the vessel in a precise and specific arrangement enabling the lid ramps to pass through cutouts provided in the top edge of the vessel, so that they find themselves below the vessel ramps, in a ready-for-locking position, from which position the user can then bring the lid and vessel ramps into locking correspondence, by turning the lid on the vessel. In practice it is often awkward and not ergonomic to position the lid on the vessel in the above-mentioned precise and specific arrangement. In addition, once the lid is in the ready-for-locking position, the user must then exert on the lid a significant force for turning it in a predetermined direction, which is not necessarily intuitive, possibly combined with exerting a downward pressure on the lid. Such locking manipulation is not only unintuitive and awkward but also requires a certain amount of physical strength, in particular because of the friction at the seal interposed between the lid and the vessel. In practice, locking a bayonet-fitting pressure cooker thus requires the lid to be mounted correctly onto the vessel, for which several attempts are frequently needed, and then requires the pressure cooker to be taken hold of with both hands, in such a manner as to hold the vessel stationary with one hand and to exert a force with the other hand for turning the lid relative to the vessel, while also exerting a downward pressure on the lid, until the locking configuration is reached. From this point of view, bayonet-fitting pressure cookers are generally much less easy and much less practical to use than, for example, pressure cookers having jaws, but such pressure cookers having jaws are much heavier than bayonet-fitting pressure cookers, and generally cost much more to manufacture.

The invention therefore proposes to remedy the various drawbacks described above, and to propose a novel cooking utensil for cooking food under pressure that is particularly lightweight, safe, and quick and inexpensive to manufacture, while being robust and particularly easy to use.

Another object of the invention is to propose a novel cooking utensil for cooking food under pressure that is very ergonomic, and in particular easy to use with one hand only.

Another object of the invention is to propose a novel cooking utensil for cooking food under pressure that is particularly simple and reliable to lock.

Another object of the invention is to propose a novel cooking utensil for cooking food under pressure that, in natural and intuitive manner, is highly suggestive as to how it should be used.

Another object of the invention is to propose a novel cooking utensil for cooking food under pressure that procures a high level of safety while it is being used.

Another object of the invention is to propose a novel cooking utensil for cooking food under pressure that is of design that makes it completely unnecessary for the user manually to hold the vessel stationary while the user is locking the lid relative to the vessel.

Another object of the invention is to propose a novel cooking utensil for cooking food under pressure that implements a locking control mechanism that is particularly robust and compact.

Another object of the invention is to propose a novel cooking utensil for cooking food under pressure that is of design making it possible to minimize the manual force exerted by a user for causing the locking to take place.

Another object of the invention is to propose a novel cooking utensil for cooking food under pressure that has a locking control mechanism that is particularly simple, lightweight, and reliable.

Another object of the invention is to propose a novel cooking utensil for cooking food under pressure that is provided with a control member that makes it particularly intuitive to perform both locking and unlocking.

Another object of the invention is to propose a novel cooking utensil for cooking food under pressure that is easy and practical to stow and to wash in a dish washer.

Another object of the invention is to propose a novel cooking utensil for cooking food under pressure that considerably limits the risk of a user lifting the entire utensil by the lid.

Another object of the invention is to propose a novel cooking utensil for cooking food under pressure that is of design that limits the risk of the user letting go of the lid.

The objects assigned to the invention are achieved by means of a cooking utensil for cooking food under pressure having a vessel provided with a handle, a lid independent of the vessel, and a bayonet-fitting locking system, said utensil being characterized in that it includes a support attached to said lid in such a manner that said lid can pivot relative to said support, the support and the vessel being designed to be united in at least one predetermined relative arrangement enabling said bayonet-fitting locking system to lock the lid to the vessel by the lid pivoting relative to the support about a central vertical axis, said lid and said support forming an independent lid subassembly that rests freely against the vessel when said support and said vessel are united in said predetermined relative arrangement, said support forming a first positioning element that projects radially beyond the lid and that is designed such that, when the support and the vessel are united in said predetermined relative arrangement, said first positioning element interacts mechanically with a complementary second positioning element that is integral with or secured to said handle to lock the relative angular positioning of the support and of the vessel in a horizontal plane that is perpendicular to said central vertical axis, while also allowing said handle to project radially outwards beyond said support.

Other features and advantages of the invention appear and can be seen in more detail on reading the following description with reference to the accompanying drawings, given merely by way of non-limiting illustration, and in which:

DETAILED DESCRIPTION

As shown in the figures, the invention relates to a cooking utensil 1 for cooking food under pressure, which utensil is designed to cook a variety of food under a level of pressure greater than atmospheric pressure, in the presence of vapor, e.g. steam. Said vapor or steam is generated by a cooking liquid, e.g. an aqueous liquid, being heated inside the utensil 1 in the presence of the food. The utensil 1 of the invention is preferably designed for household use, but it should be understood that the invention may also relate to professional or semi-professional utensils. The utensil 1 of the invention is designed to allow pressure to build up exclusively under the effect of a heat source (which may be incorporated or external), without any external pressure being supplied. The cooking utensil 1 for cooking food under pressure is thus advantageously designed to be subjected to an external heat source, such as, for example, a hotplate or ring (operating by induction, electricity, or gas), and thus constitutes a pressure cooker not having an incorporated heat source and preferably designed to be placed on an independent hotplate or ring for heating the contents. The cooking apparatus 1 of the invention includes at least one vessel 2 forming a cooking receptacle designed to receive the food to be cooked and, in this example, being substantially circularly symmetrical about a central vertical axis X-X', which extends in a direction that is similar to the vertical direction when the utensil 1 is operating normally, i.e. when it is resting on a horizontal plane. In conventional manner, the vessel 2 is manufactured from a metal material, such as stainless steel or aluminum. The vessel 2 includes a bottom 2A that is, for example, a multi-layer, heat-conductive bottom. The vessel 2 also includes an annular side wall 2B that extends upwards between said bottom 2A and a free top edge 2C, which, in this example, is of circular shape, and which defines an access opening that gives access to the inside of the vessel 2. The shaping of the free top edge 2C is described in more detail below, in relation to the locking means of the utensil 1. As shown in the figures, the vessel 2 is advantageously provided with at least one handle 2D, that is fastened to said vessel 2, in such a manner as to project outwards from said vessel. As shown in the figures, said handle 2D projects from the utensil 1 in which the vessel 2 locally forms the outer casing, so that a user can manipulate the vessel 2, and indeed the utensil 1, by means of said handle 2D. In the embodiment shown in the figures, said handle 2D is mounted on the outside face of the side wall 2B of the vessel 2, in such a manner as to extend radially outwards from the vessel 2 and thus to form graspable means designed to be taken hold of manually by the user in order to manipulate the vessel 2 (e.g. to lift it and to move it). In the embodiment shown in the figures, the cooking utensil 1 has two identical handles 2D, 2E fastened to the side wall 2B of the vessel 2 in diametrically opposite manner about the central axis X-X', said handles 2D, 2E being, in this example, disposed in the vicinity of the free top edge 2C of the vessel 2. However, it is quite possible for the vessel 2 to be provided with a single vessel handle, or with more than two vessel handles (e.g. three or four), without going beyond the ambit of the invention.

The utensil 1 of the invention also includes a lid 3 designed to be associated with the vessel 2 and to be locked relative to said vessel 2 to form a cooking enclosure suitable for allowing pressure to build up in it, i.e. a cooking enclosure that is sufficiently hermetically sealed to allow the pressure of the utensil 1 to build up. In order to obtain such leaktight, hermetic sealing, the utensil 1 advantageously includes a seal (not shown), preferably formed by a flexible annular gasket, made of elastomer, for example, and designed to be interposed between the lid 3 and the vessel 2, thereby preventing any uncontrolled leak of steam and/or of air between the inside of the enclosure and the outside. The lid 3 is independent of the vessel 2, i.e. it is not attached or connected to it permanently (which, in particular, means that the lid 3 and the vessel 3 are not connected together by a hinge or some other mechanical coupling). The lid 3 may thus be freely manipulated and moved by a user, independently of the vessel 2. In conventional manner, the lid 3 is manufactured from a metal material, such as stainless steel or aluminum. It advantageously has a shape that is complementary to the shape of the vessel 2, e.g. substantially disk-shaped, and that advantageously extends in a mean plane that is substantially parallel to the mean plane in which the bottom 2A of the vessel 2 extends (i.e. a plane that is substantially horizontal in this example) once it is mounted and locked on said vessel. In the embodiment shown in the figures, the lid 3 includes a disk-shaped lid element 3A of shape and dimensions complementary to the shape and dimensions of the access opening delimited by the free top edge 2C of the annular side wall 2B of the vessel 2. In this embodiment, the lid 3 advantageously includes an annular band 3B, e.g. of substantially cylindrical or frustoconical shape, extending between a first circular edge 30B that is integral with the disk-shaped lid element 3A (in this example, at the periphery thereof), and a free second circular edge 31B, which is, for example, itself extended by an end flange. As shown in the figures, the disk-shaped lid element 3A extends substantially in a horizontal mean plane, i.e., in this example, a mean plane parallel to the mean extension plane of the bottom 2A of the vessel 2 when the lid 3 is associated with the vessel 2 to form the cooking enclosure, while the annular band 3B extends substantially vertically, i.e. parallel to the central axis X-X', the end flange extending substantially horizontally. Naturally, this in no way excludes the possibility of the disk-shaped lid 3A being, as shown in the figures, slightly domed or dished locally, e.g. in order to accommodate a control mechanism. In the embodiment shown in the figures, the annular band 3B is formed by a dropped edge that extends downwards from the periphery of the disk-shaped lid element 3A. In this embodiment, the lid 3 is designed to come to fit over the top of the vessel 2 in substantially snug manner, so that the annular band 3B externally surrounds the top of the annular side wall 2B and the free top edge 2C, while the disk-shaped lid element 3A rests on and bears against the free edge 2C via the sealing gasket interposed between the vessel 2 and the lid 3. However, it is quite possible, alternatively, for the annular band 3B to be designed to fit into the vessel 2 so as to be surrounded by and contained in the vessel 2, without going beyond the ambit of the invention. The vessel 2 and the lid 3 thus constitute complementary respective casings that are preferably metal casings and that, once associated with each other, form a resulting metal casing delimiting a closed volume inside which the food is to be cooked under steam pressure.

The cooking utensil 1 of the invention for cooking food under pressure advantageously includes pressure regulation means 4, such as, for example, a valve, preferably mounted on the lid 3, e.g. in such a manner as to be carried directly by said lid 3, and arranged to maintain the pressure prevailing in the cooking enclosure at a substantially constant predetermined value referred to as the "operating pressure", which value exceeds atmospheric pressure by a value that, for example, lies substantially in the range 10 kilopascals (kPa) to 120 kPa, and is preferably about 100 kPa. The general operating principle of such pressure regulation means is well known per se, so that it is not necessary to describe it in any further detail below. The cooking utensil 1 for cooking food under pressure may include other operating members (e.g. opening safety means 5 that are described in more detail below, an overpressure safety valve 6, etc.).

Figure 16:
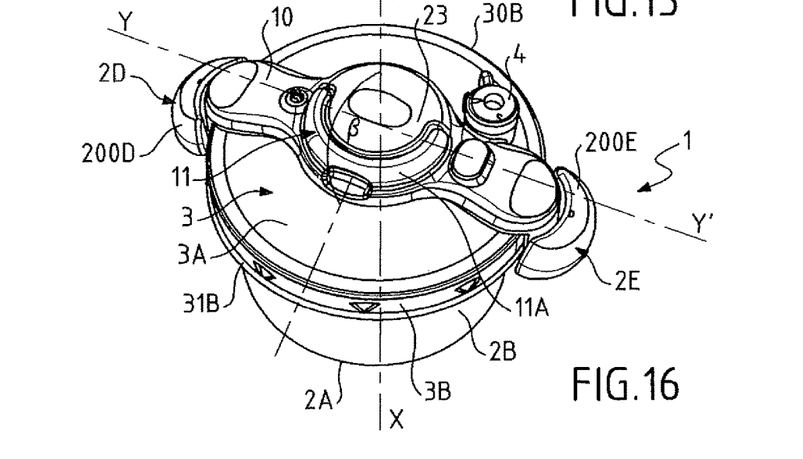
FIG. 16 is a diagrammatic perspective view of the pressure cooker of FIG. 1, with the lid subassembly in the locking configuration, so that the lid is locked relative to the vessel, the control member being lowered towards the lid in a retracted position corresponding to said locking.
Figure 17:
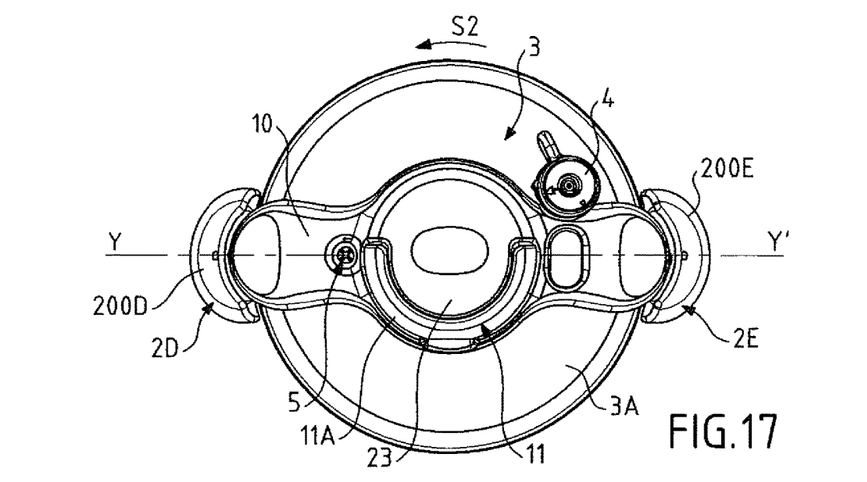
FIG. 17 is a view from above of the pressure cooker of FIG. 16.
Figure 18:
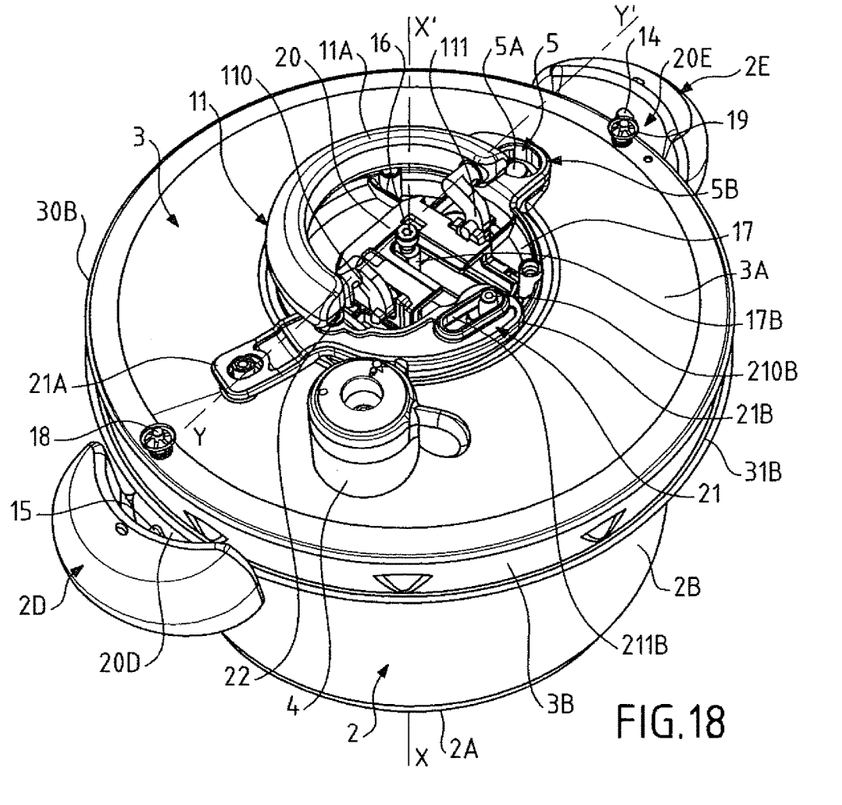
FIGS. 18 to 21 are views analogous respectively to the views of FIGS. 5, 8, 9, and 10, except that the control member is in its retracted position corresponding to the lid being locked.
Figure 19:
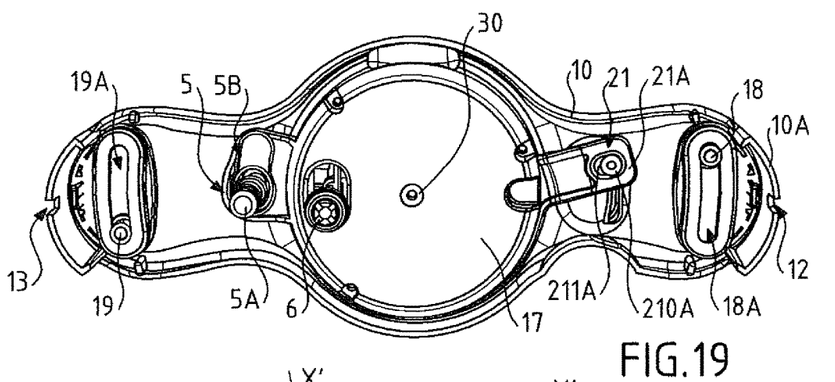
Figure 20:
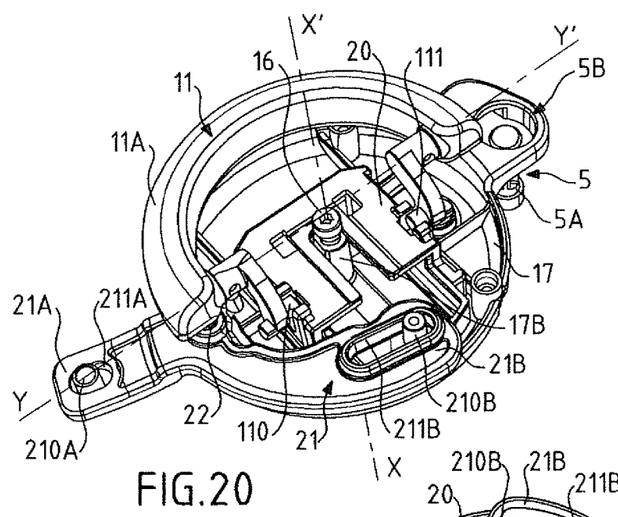
Figure 21:
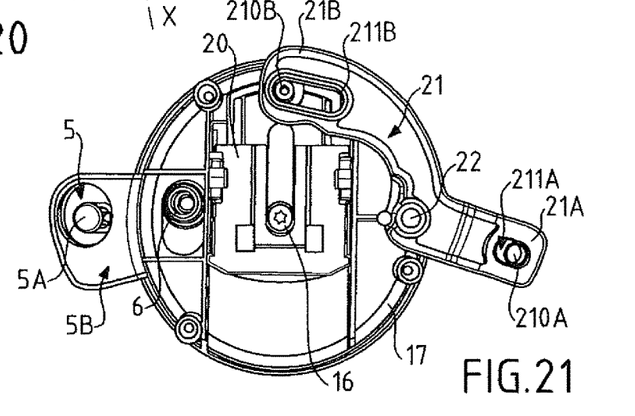

The utensil 1 of the invention also includes a bayonet-fitting locking system, in order to enable the cooking enclosure formed by the association of the lid 3 and of the vessel 2 to reach at least the above-mentioned operating pressure without any risk of the lid 3 coming off under the effect of the pressure prevailing inside the enclosure. In other words, the locking system is designed to provide a mechanical coupling between the vessel 2 and the lid 3 that is sufficiently robust to prevent the lid 3 from separating from the vessel 2 under the effect of pressure building up inside the cooking enclosure. More precisely, said bayonet-fitting locking system is designed to lock and to unlock the lid 3 relative to the vessel 2 by pivoting the lid 3 relative to the vessel 2, in this example about said central vertical axis X-X', so as thus to cause the utensil 1 to go from a ready-for-locking configuration, in which the lid 3 is mounted on the vessel 2 and is resting freely on said vessel 2 (FIGS. 1 and 3), to a locking configuration in which the vessel 2 and the lid 3 interact to prevent them from being separated freely (FIGS. 16 and 17), and vice versa. Thus, in the embodiment shown in the figures, the utensil 1 goes from its ready-for-locking configuration to its locking configuration by the lid 3 being turned relative to the vessel 2 in a clockwise direction S1 over a predetermined angular stroke about the central axis X-X', and goes from its locking configuration to its ready-for-locking configuration by the lid 3 being turned relative to the vessel 2 in a counterclockwise opposite direction S2 over said predetermined angular stroke about the central axis X-X' (FIGS. 3 and 17), it being understood that the reverse is quite possible without going beyond the ambit of the invention (S1 then being the counterclockwise direction and S2 being the clockwise direction). For this purpose, the bayonet-fitting locking system of the cooking utensil 1 advantageously includes first and second series of projections 7A-7J, 8A-8J that are integral respectively with the lid 3 and with the vessel 2, and that, in order to lock and unlock the lid 3 relative to the vessel 2, are designed to come to engage and to disengage mutually by the lid 3 being turned relative to the vessel 2 about the central vertical axis X-X' over said predetermined angular stroke. As is well known per se, the projections 7A-7J, 8A-8J of each of the first and second series are designed to co-operate in pairs, i.e. each of the projections of one of said series is brought, by the lid 3 being turned relative to the vessel 2, to go under a corresponding projection of the other series to lock the lid 3 relative to the vessel 2. In the embodiment shown in the figures, the projections 7A-7J of the first series, integral with the lid 3, project radially inwards from the lid 3, while the projections 8A-8J of the second series, integral with the vessel 2, project radially from the outside face of the side wall 2B of the vessel 2, outwards from said vessel 2. However, it is quite possible for the locking projections 7A-7J on the lid to project outwards from the lid 3 and for the vessel projections 8A-8J to project radially inwards from the vessel. The invention is therefore not limited to a particular configuration of the locking ramps of the bayonet-fitting locking system, the essential requirement being that lid projections 7A-7J and the vessel projections 8A-8J respectively form lid ramps and vessel ramps that co-operate mutually by the vessel 2 and the lid 3 being turned relative to each other, in this example about the central vertical axis X-X', so that the lid ramps come to be positioned under the vessel ramps in order to form a mechanical coupling between the vessel 2 and the lid 3 that is capable of withstanding the internal pressure prevailing inside the cooking enclosure. In the example shown in the figures, each of the lid projections 7A-7J is constituted by a three-dimensional (3D) element obtained by local 3D deformation of the material of which the casing of the lid 3 is made, and, more precisely, of which the annular band 3B is made, along which band the projections 7A-7J are preferably disposed, optionally at regular intervals. Each projection thus forms a protuberance that is formed integrally with the annular band 3B and that projects from said annular band while defining, on one side, a convex inside face, and, on the other side, as a "negative", an opposite concave outside face corresponding, for example, to the imprint due to application of a forming tool, and preferably of a die-stamping tool. However, the invention is absolutely not limited to implementation of specific projections 7A-7J, and in particular projections obtained by die-stamping as in the example shown in the figures. It is, for example, quite possible for the lid projections 7A-7J to be formed by flat tongues obtained by localized inward folding-over of the free edge 31B of the annular band 3B of the lid 3. However, the use of a 3D element is preferred because it makes it easy, merely by deforming material (by die-stamping or some other technique), to obtain a projection that has excellent mechanical properties and small dimensions. By means of such small dimensions, it is possible to cause the utensil 1 to go from the ready-for locking configuration (pre-locking configuration) to the locking configuration by the lid 3 and the vessel 2 being turned relative to each other through a relatively small angle, e.g. an angle less than 30°, it being understood that the invention is not limited to any particular angle, which may be greater than or equal to 30°, or, conversely, considerably less than 30°, e.g. lying in the range 10° to 25°. In the example shown in the figures, the vessel projections 8A-8J are formed by an annular rim that projects outwards beyond and from the free top edge 2C, notches 9A-9J being provided through said annular rim in such a manner as to allow said lid projections 7A-7J to pass through, so that the portions of said annular rim that extend between each notch 9A-9J form respective vessel ramps designed to co-operate with the lid projections 7A-7J that form the lid ramps. Thus, when the lid 3 comes to fit over the top of the vessel 2, the lid projections 7A-7J can pass through the notches 9A-9J so as to be situated lower than the annular rim. The utensil 1 is then in its pre-locking configuration (also referred to as the "ready-for-locking" configuration), from which the locking configuration can be reached merely by turning the lid 3 relative to the vessel 2 about the vertical axis X-X', thereby causing the projections 7A-7J of the lid 3 and the notches 9A-9J of the annular rim to be shifted angularly to achieve locking of the "bayonet-fittings" type. Preferably, in the embodiment shown in the figures, the lid projections 7A-7B are located on the annular band 3B of the lid 3 at some distance from the free second circular edge 31B of said annular band 3B, in such a manner that, below said 3D elements, the annular band 3B forms a self-centering skirt for self-centering the lid 3 relative to the vessel 2. In co-operation with the side rim that is almost continuous (except for the notches 9A-9J) and that forms the vessel ramps, this annular skirt enables the lid 3 to be positioned naturally and spontaneously in a manner such that it is centered relative to the vessel 2 when it is placed on it.

In accordance with the invention, the utensil 1 comprises a support 10 attached to said lid 3, permanently in this example, in such a manner that said lid 3 can pivot relative to said support 10, e.g. between two positions corresponding respectively to an unlocking configuration and to a locking configuration. The two positions in question, between which the lid 3 can pivot relative to the support 10, are advantageously separated by a predetermined angular stroke corresponding to the stroke required to cause the utensil to go from its pre-locking configuration (ready-for-locking configuration) shown in FIG. 1 to its locking configuration shown, for example, in FIG. 16.

The support 10 and the vessel 2 are designed to be united in at least one predetermined relative arrangement (shown, for example, in FIGS. 1 and 3) enabling said bayonet-fitting locking system to lock the lid 3 relative to the vessel 2 by the lid 3 pivoting relative to the support 10 about the central vertical axis X-X'. In other words, when the support 10 is mounted on the vessel 2 in said predetermined relative arrangement, the lid 3 is then in a position from which it can pivot (while the support 10 and the vessel 2 remain stationary relative to each other) so as to put the lid ramps and the vessel ramps into locking correspondence. Advantageously, said predetermined relative arrangement corresponds to a configuration in which the lid 3 and the support 10 that is attached to it fit over the top of the vessel 2 so that the lid ramps are situated below the vessel ramps (after they have passed through the notches 9A-9J), and angularly offset relative to the vessel ramps. It then suffices to cause the lid 3 pivot relative both to the support 10 and to the vessel 2 in order to remove the angular offset and in order to bring the vessel ramps and the lid ramps into mutual locking superposition. Advantageously, said lid 3 and said support 10 form a lid subassembly, i.e. a single unit, which advantageously also includes a sealing gasket carried by the lid 3 and designed to be interposed between the lid 3 and the vessel 2 in order to make the cooking assembly formed by uniting the lid 3 and the vessel 2 substantially sealed. Said lid subassembly is independent, i.e. it is not attached or connected to the vessel 2 permanently (which, in particular, means that the lid subassembly and the vessel 2 are not connected together by a hinge or some other mechanical coupling). The lid subassembly may thus be freely manipulated and moved by a user, independently of the vessel 2, over a free path. As shown in the figures, said independent lid subassembly rests freely against the vessel 2 (and, in this example, on the vessel 2) when said support 10 and said vessel 2 are united in said predetermined relative arrangement. This means that, in the predetermined relative arrangement, the lid subassembly is not attached to the vessel 2 (in particular by a hinge or any other articulated coupling means).

Figure 6:
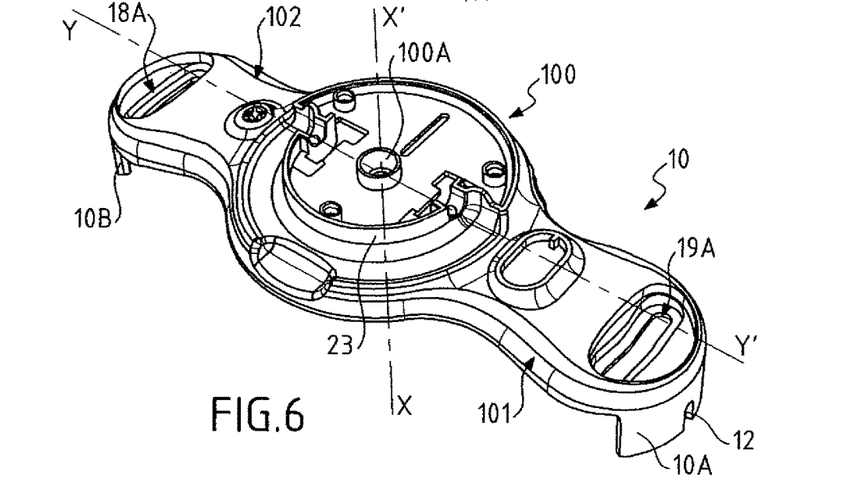
FIG. 6 is a diagrammatic perspective view of a part made of a plastics material and forming the support omitted in FIG. 5.
Figure 7:
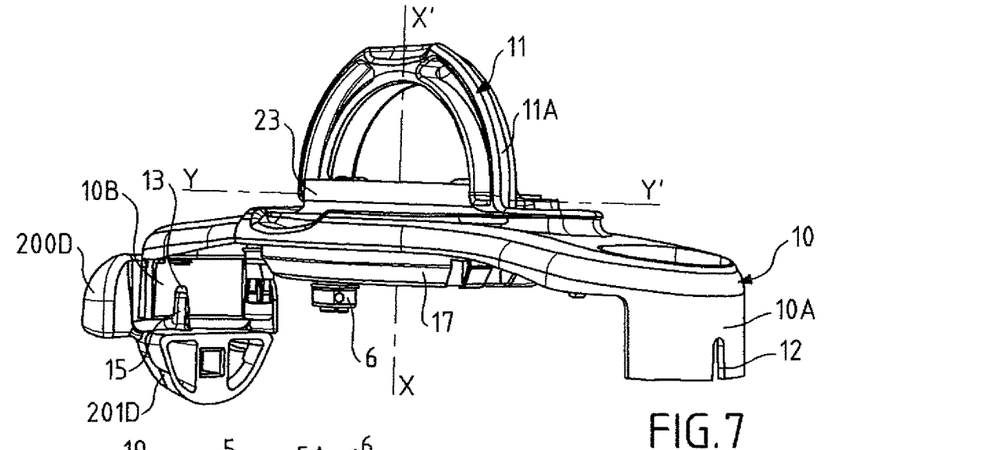
FIG. 7 is a diagrammatic perspective view of a design detail of the pressure cooker of FIGS. 1 to 6, making it possible, in particular, to see the co-operation between the support and the vessel handle for locking the relative angular position of the lid and of the vessel in a horizontal plane when said support and said vessel are united in said predetermined relative arrangement.
Figure 8:
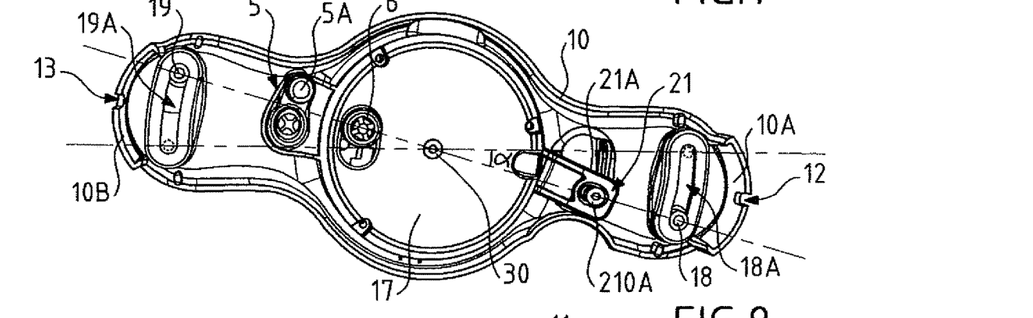
FIG. 8 is a view from below showing the design detail of FIG. 7, except that the vessel handle has been omitted.
Figure 9:
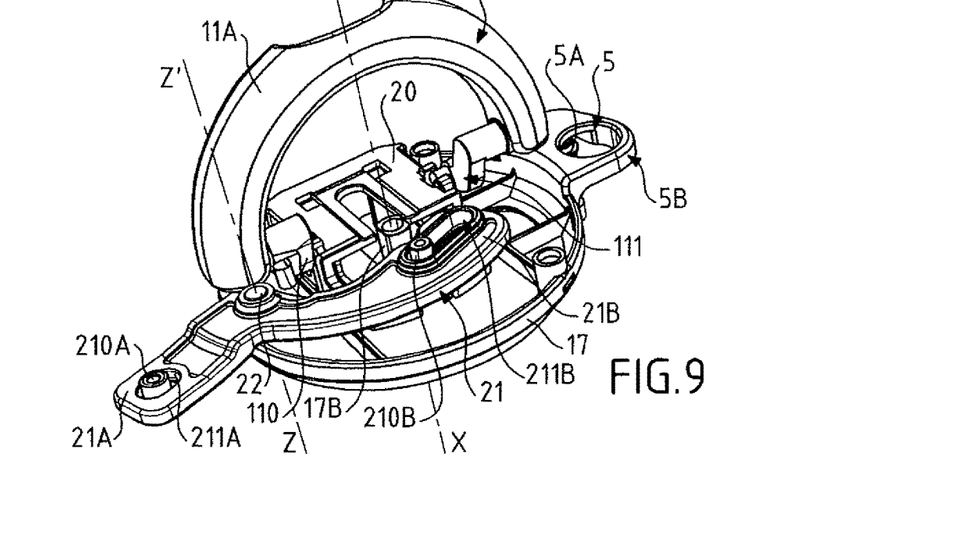
FIG. 9 is a diagrammatic perspective view of an embodiment detail of the pressure cooker of FIGS. 1 to 8, more precisely relating to the control member for controlling locking/unlocking and to the transformation device for transforming the movement of the control member into pivoting of the lid relative to the support.
Figures 10, 11, 12, 13:
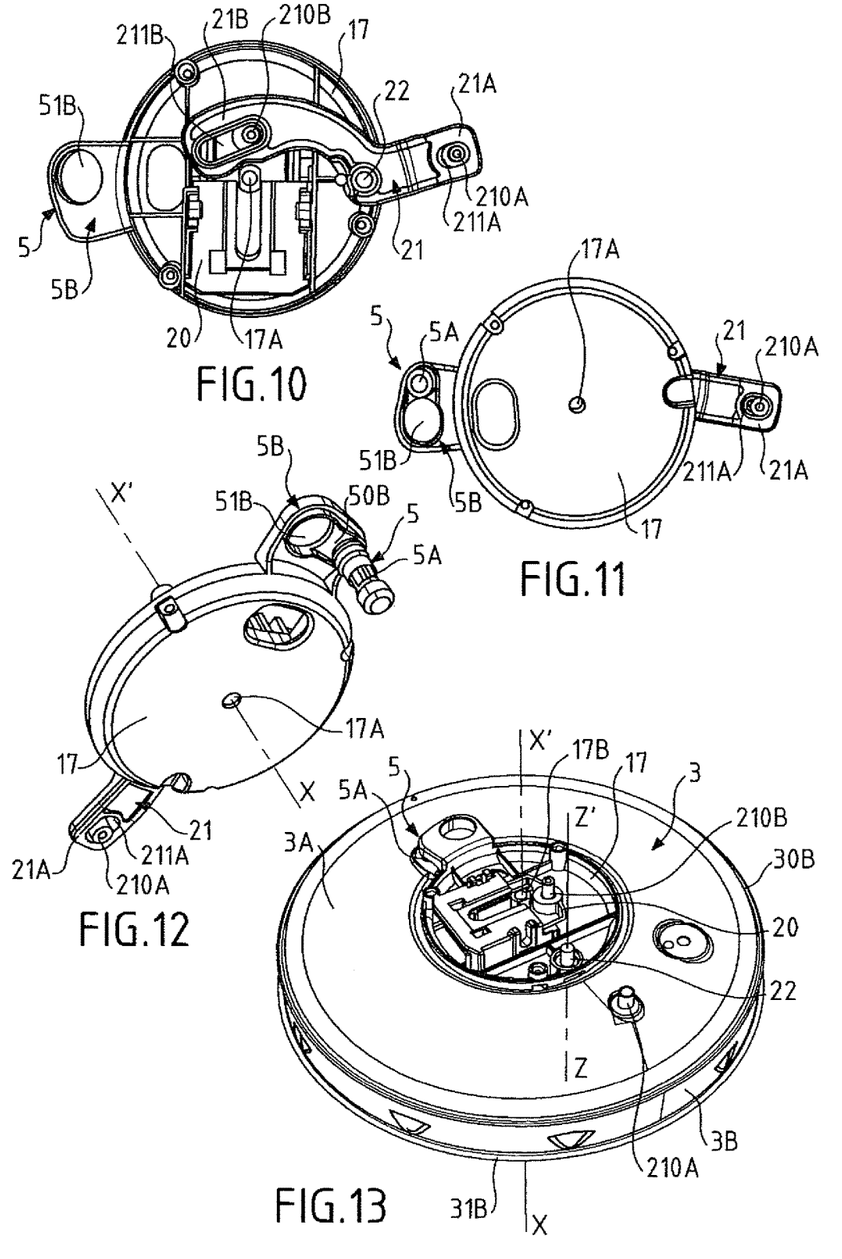
FIG. 10 is a view from above of the embodiment detail of FIG. 9, except that the control member has been omitted.
FIG. 11 is a view from below of the embodiment detail of FIG. 10.
FIG. 12 is a perspective view from below of the embodiment detail of FIGS. 10 and 11.
FIG. 13 shows the lid of the pressure cooker of FIGS. 1 to 12, on which lid there are mounted some of the parts forming the support and the transformation device for transforming the manual movement of the control member into pivoting of the lid relative to the support.
Figure 14:
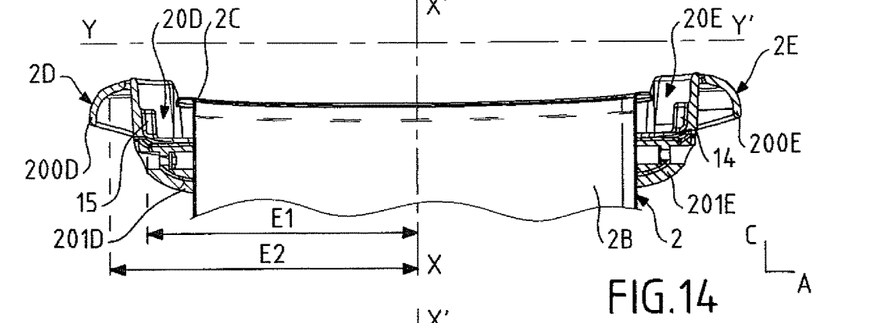
FIG. 14 is a section view on the section plane A-C through the vessel of FIG. 2.

In accordance with the invention, the support 10 forms at least a first positioning element 12, 13 that projects radially beyond the lid 3 to which it is attached, i.e. that extends perceptibly beyond the periphery of the lid 3 in the radial direction in question Y-Y'. In other words, each first positioning element 12, 13 projects laterally from the lid 3, and forms a radial projection at the periphery of the lid 3. Advantageously, the support 10 has a top portion 100, 101, 102 that is mounted above the lid 3, e.g. on and against the outside face of the disk-shaped lid element 3A, and that projects radially beyond said lid 3 to be extended by a vertical dropped edge 10A, 10B that carries said first positioning element and that extends, in this example locally facing the annular band 3B. For example, in the embodiment shown in the figures, the support 10 is in the form of a crosspiece, i.e. in the form of a substantially elongate part that extends diametrically over the lid 3 and that is extended, in this example, at each of its ends by a respective dropped edge 10A, 10B, each of which forms a respective one of the two first positioning elements disposed diametrically opposite each other about the central vertical axis X-X'. Preferably, the crosspiece in question has a larger central zone 100, e.g. that is circular in general shape, extended on either side by first and second arms 101, 102 that themselves are terminated by respective ones of said dropped edges 10A, 10B. The central portion 100 is advantageously provided with a central orifice 100A through which a pin 30 fastened to the lid 3 is designed to be inserted, at the center of said lid, about which pin the support 10 is designed to turn about the central vertical axis X-X'. For example, the pin 30 is welded to the lid 3 in such a manner as to extend vertically from the center of said lid, and thus to be capable of being inserted into said orifice 100A. Preferably, the pin 30 is provided with a tapped recess designed to co-operate with a screw 16 in order to fasten the support 10 to the lid 3 while also enabling the lid 3 to pivot about the pin 30. Advantageously, in addition to the part in the form of a crosspiece shown in FIG. 6, the support 10 also includes a plate 17 that is of circular general shape substantially complementary to the shape of the central portion 100 of the crosspiece and that is designed to be interposed between said crosspiece and the top face of the lid 3 to form a housing designed to receive at least in part a control mechanism for causing the lid 3 to pivot relative to the support 10. For example, in the embodiment shown in the figures, the plate 17 is in the form of a dish made of a plastics material and provided with a central orifice 17A, which is extended via a vertical cylindrical tube in which the pin 30 is designed to be inserted. The crosspiece that can be seen in FIG. 6 is itself designed to be fastened (e.g. by means of a plurality of screws) permanently to the plate 17, in order to co-operate with said plate to form a single-unit, one-piece crosspiece subassembly that is held on the lid 3 by means of the coupling between the pin 30 and the screw 16, which coupling allows the lid 3 to pivot relative to the above-mentioned crosspiece subassembly that, in this example, forms the support 10. As explained above, the lid 3 is designed to pivot relative to the support 10 between two positions, namely a first position (corresponding to locking), and a second position (corresponding to unlocking), the two positions being separated by a predetermined angular stroke. Preferably, the first position and/or the second position is a stable position/are stable positions. It is however quite possible for one or the other of said first and second positions to be unstable, so that whenever the lid 3 moves away from one and/or the other of said first and second positions, it is automatically urged back into the other position (e.g. by a spring). Advantageously, the first position and/or the second position is an abutment position/are abutment positions. For example, in the embodiment shown in the figures, the utensil 1 is provided with at least one guide stud 18, and preferably with two guide studs 18, 19 that are disposed diametrically opposite each other about the central axis X-X' and attached to the lid 3 permanently (e.g. by being welded to said lid in such manner as to extend vertically upwards from the outside surface of said lid 3, and, in this example, at the periphery of said lid, as shown in the figures). Each of said guide studs 18, 19 is designed to slide in a complementary elongate guide groove 18A, 19A provided in the support 10, e.g. towards each end of said support 10. The length of each groove 18A, 19A is adapted, in this example, to the angular stroke of the lid 3 relative to the support 10. Each stud 18, 19 is also provided with a head of larger cross-section that co-operates with the edges of the corresponding groove 18A, 19A to retain the support 10 vertically and to prevent it from moving vertically away from the lid 3.

Said first positioning element 12, 13 is designed such that, when the support 10 and the vessel 2 are united in said predetermined relative arrangement, said first positioning element 12, 13 interacts mechanically with a complementary second positioning element 14, 15 that is integral with or secured to said handle 2D, 2E provided on the vessel 2 to lock the relative angular positioning of the support 10 and of the vessel 2 in a horizontal plane AB that is perpendicular to said central vertical axis X-X', while also allowing said handle 2D, 2E to project radially outwards beyond said support 10. In other words, whenever the support 10 and the vessel 2 are united in said predetermined relative arrangement, the support 10 and the vessel handle 2D, 2E are designed to interact, directly or indirectly, in order substantially to prevent the support 10 from being able to pivot relative to the vessel 2, in this example about said central vertical axis X-X'. This means that uniting the support 10 and the vessel 2 in said predetermined relative arrangement causes interlocking of the support 10 and of the vessel 2, by said first positioning element 12, 13 and said complementary second positioning element 14, 15 co-operating, thereby, in this example, preventing the support 10 from turning about the central vertical axis X-X' when the lid 3 is resting on the vessel 2. This locking of the relative angular position of the support 10 and of the vessel 2, obtained by means of the mechanical interaction between the first and second positioning elements 12, 13, 14, 15, enables the support 10 to act as a stationary structure that is stationary relative to the vessel 2 and relative to which the lid 3 can pivot about the central vertical axis X-X' over a predetermined angular stroke so as to go from an unlocked state (shown in FIG. 1) to a locked state (shown in FIG. 16).

As explained above, the utensil 1 is designed so that, when the first positioning element 12, 13 interacts mechanically with the complementary second positioning element 14, 15, the support 10 does not fully cover the handle 2D, 2E, at least a portion of which therefore projects radially from the utensil 1, without the support 10 fitting over the top of it. This means that, in projection on a horizontal plane perpendicular to the central vertical axis X-X', the handle 2D, 2E extends the support 10 in the radial direction Y-Y', while projecting radially beyond said support 10. Each handle 2D, 2E with which the vessel 2 is provided thus advantageously extends the support in the radial direction Y-Y' and outwards, so that the support 10 fits over the top of each handle 2D, 2E only in part, thereby allowing an end portion of each vessel handle 2D, 2E to be free. By means of this technical characteristic, the utensil 1 of the invention is made easier to use, because the user can identify more easily the zone of co-operation of the complementary first and second elements 12, 13, 14, 15, thereby enabling the user to achieve more easily the predetermined relative arrangement allowing locking to take place. Such a design also offers advantages in terms of aesthetic appearance, as well as a functional advantage by leaving at least a portion of the handle 2D, 2E with which the vessel 2 is provided visible and therefore available for being taken hold of, without said portion available for being taken hold of being made too thick, which could make it less practical. The user is thus not tempted to use other portions of the utensil 1 to lift it, with the risks that could then ensue. In addition, by extending radially outwards beyond said support 10, the handle 2D, 2E makes it possible to protect said support and its first positioning element 12, 13 from damage that might result, for example, from an impact or from a flame from a cooking ring. In addition, if the user takes hold of and lifts the utensil 1 by the portion of handle 2D, 2E that projects radially outwards beyond the support 10, the effect is to contribute to bringing the support 10 and the handle 2D, 2E closer together due to the handle working in flexion, thereby contributing to consolidating the mechanical interaction between the support 10 and each handle 2D, 2E.

Advantageously, said mechanical interaction of said first positioning element 12, 13 with said second positioning element 14, 15 is male/female co-operation, based on all or some fraction of a male portion being inserted into a female portion in order to secure the angular locking mechanically. Said male/female co-operation is based, for example, on mutual interfitting engagement of said first and second positioning elements 12, 13, 14, 15. Preferably, in the embodiment shown in the figures, the first and second positioning elements 12, 13, 14, 15 respectively have complementary male and female shapes. However, it is quite possible, without going beyond the ambit of the invention, for the first positioning element 12, 13 to have a male shape while the second positioning element 14, 15 has a female shape.

In the embodiment shown in the figures, the vessel 2 is provided with two vessel male shapes 14, 15 disposed diametrically opposite each other about the central vertical axis X-X' and fastened to the outside face of the side wall 2B of the vessel 2, while the support 10 is provided with two complementary female shapes 12, 13 disposed diametrically opposite each other on the lid 3 about the central vertical axis X-X', said support female shapes 12, 13 being, in this example, disposed facing the outside face of the annular band 3B of the lid 3. It is however quite possible, without going beyond the ambit of the invention, for said support 10 and said vessel 2 to be provided respectively with a single support shaped portion and with a single vessel shaped portion, or indeed, rather than having male/female shaped portions designed to co-operate by interfitting engagement, for the support 10 and the vessel 2 to be provided with interlocking elements of some other type based on implementing force co-operation (by friction, clipping, meshing, magnetic attraction, etc.) sufficient for locking the relative angular position of the support 10 and of the vessel 2.

Advantageously, and as shown in the figures, said female shaped portion is formed by a notch provided in the vertical dropped edge 10A, 10B, while the male shaped portion is formed by a rib that is advantageously carried by the handle 2D, 2E, and that is preferably an integral part of said handle. Thus, in the embodiment shown in the figures, each vessel handle 2D, 2E is fastened permanently to the side wall 2B of the vessel 2 and incorporates a respective male shaped portion, which, for example, is in the form of a rib that is advantageously formed integrally with the corresponding handle 2D, 2E. As described above, the support 10 is advantageously in the form of a crosspiece that extends over the lid 3 (while being connected to said lid via a pivot coupling) and that is extended at its ends by respective vertical dropped edges 10A, 10B that project radially beyond the lid 3 and extend substantially parallel to the annular band 3B, outside said band. A notch is advantageously provided in the free bottom edge of each of said dropped edges 10A, 10B of the support 10 to form a female shaped portion that is complementary to the rib preferably forming the male shaped portion.

Advantageously, said handle 2D, 2E is shaped to provide a recess 20D, 20E designed to receive said first positioning element 12, 13, when the support 10 and the vessel 2 are united in the above-mentioned predetermined relative arrangement. Preferably, the above-mentioned rib, forming the male shaped portion of the second positioning element 14, 15, is provided in said recess 20D, 20E, as shown in the figures. Advantageously, said handle 2D, 2E includes a graspable portion 200D, 200E that is shaped to be capable of being taken hold of manually in order to enable the vessel 2 to be manipulated via it. In other words, said graspable portion 200D, 200E has a shape that makes it appropriate for being grasped by a hand of a user with a view to lifting or transporting the vessel 2. Preferably, said handle 2D, 2E also includes a fastening portion 201D, 201E that interconnects said vessel 2 and said graspable portion 200D, 200E. In the embodiment shown in the figures, the fastening portion 201D, 201E extends radially outwards from the side wall 2B of the vessel 2, and supports the corresponding graspable portion 200D, 200E. Preferably, said recess 20D, 20E is delimited by said graspable portion 200D, 200E. For example, in the embodiment shown in the figures, each graspable portion 200D, 200E has an inner side face that extends substantially vertically parallel to the side wall 2B of the vessel 2, the rib forming the second positioning element 14, 15 advantageously projecting radially inwards from said inner side face of the graspable portion 200D, 200E. Thus, in the embodiment shown in the figures, said graspable portion 200D, 200E and said second positioning element 14, 15 are separated from the vessel 2, in the radially direction Y-Y', respectively by a first spacing E1 and by a second spacing E2 that is less than said first spacing E1, so that the handle 2D, 2E projects radially outwards beyond the zone of mechanical interaction between said first and second positioning elements 12, 13, 14, 15.

Figure 15:
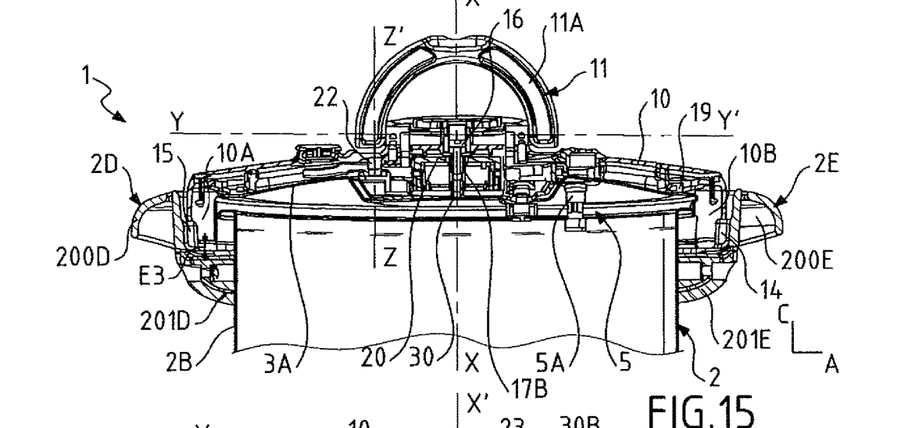
FIG. 15 is a section view on the section plane A-C through the pressure cooker of FIG. 1.

Advantageously, said support 10 and said vessel 2 are designed so that, when they are united in said predetermined relative arrangement, said lid subassembly (which includes at least the lid 3 and the support 10) rests and bears directly against the vessel 2, in such a manner as to maintain a vertical spacing E3 between the support 10 and the handle 2D, 2E, so that said support 10 does not bear vertically on the handle 2D, 2E. In other words, when the support 10 and the vessel 2 are united in said predetermined relative arrangement, the weight of the lid subassembly is applied directly to the free top edge 2C of the vessel 2, and is not exerted on the handle 2D, 2E. This means that when the support 10 and the vessel 2 are united in said predetermined relative arrangement, the vertical dropped edge 10A, 10B does not come to bear against the handle 2D, 2E, but rather remains separated therefrom by a spacing E3 (cf. FIG. 15), the lid subassembly resting directly on the free top edge 2C of the vessel 2 via the annular sealing gasket (not shown) carried by the lid 3 and designed to come to be interposed between the free top edge 2C and the periphery of the inside face of the lid 3.

Figures 1, 2, 3, 4:
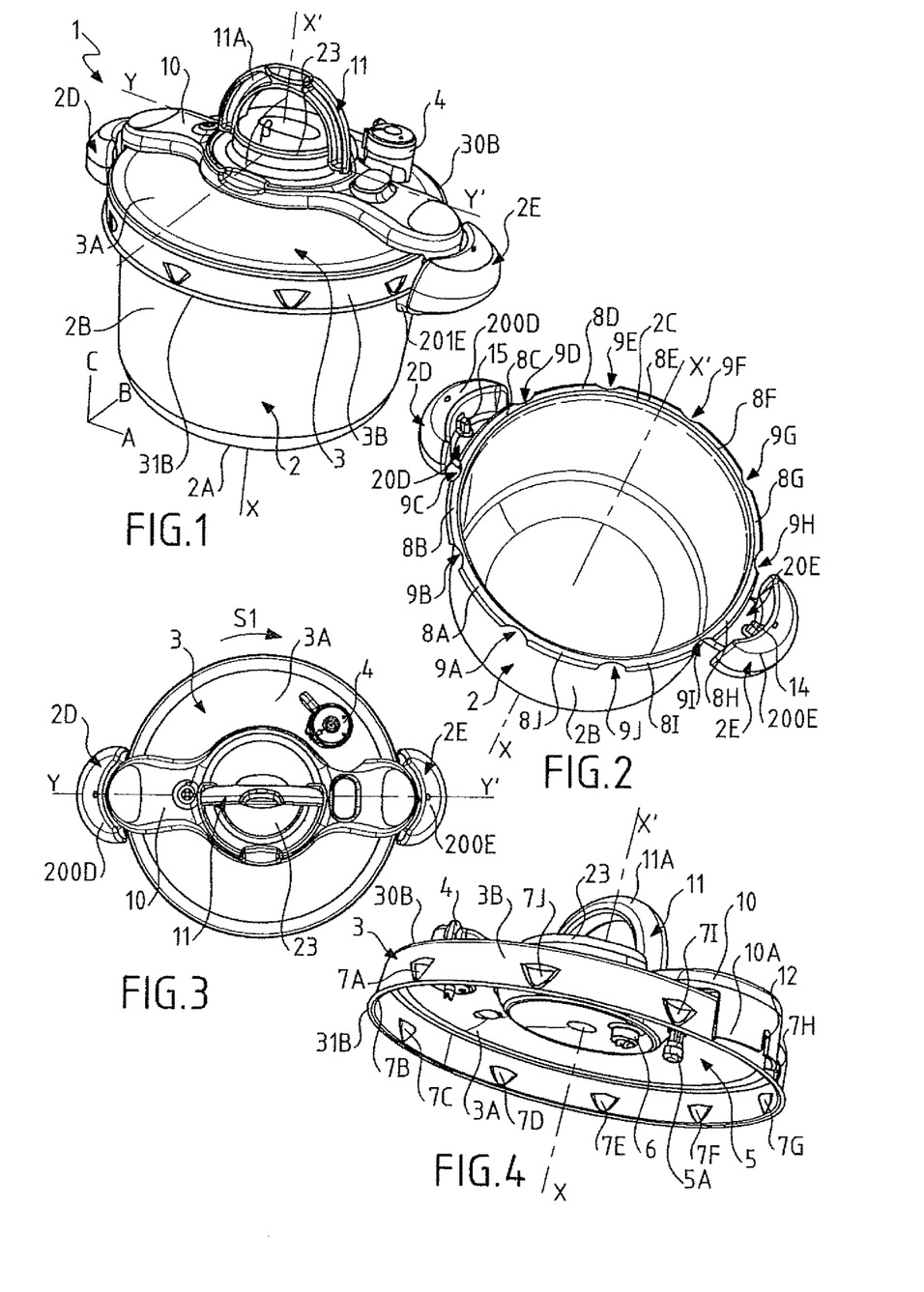
FIG. 1 is a diagrammatic perspective view of a cooking utensil of the invention for cooking food under pressure that has bayonet-fitting locking and that is equipped with a control member for controlling the locking/unlocking, said utensil being in a ready-for-locking configuration, in which the support and the vessel are united in a pre-locking predetermined relative arrangement.
FIG. 2 is a diagrammatic perspective view from above of the vessel of the pressure cooker of FIG. 1, said vessel being provided with two side handles enabling it to be manipulated.
FIG. 3 is a view from above of the pressure cooker of FIG. 1.
FIG. 4 shows a lid subassembly that is part of the utensil of FIGS. 1 and 3, and that includes both the lid and the support, said lid subassembly being in an unlocking configuration, ready to come and fit over the top of the vessel of FIG. 2 in the pre-locking predetermined relative arrangement shown in FIG. 1.
Figure 5:
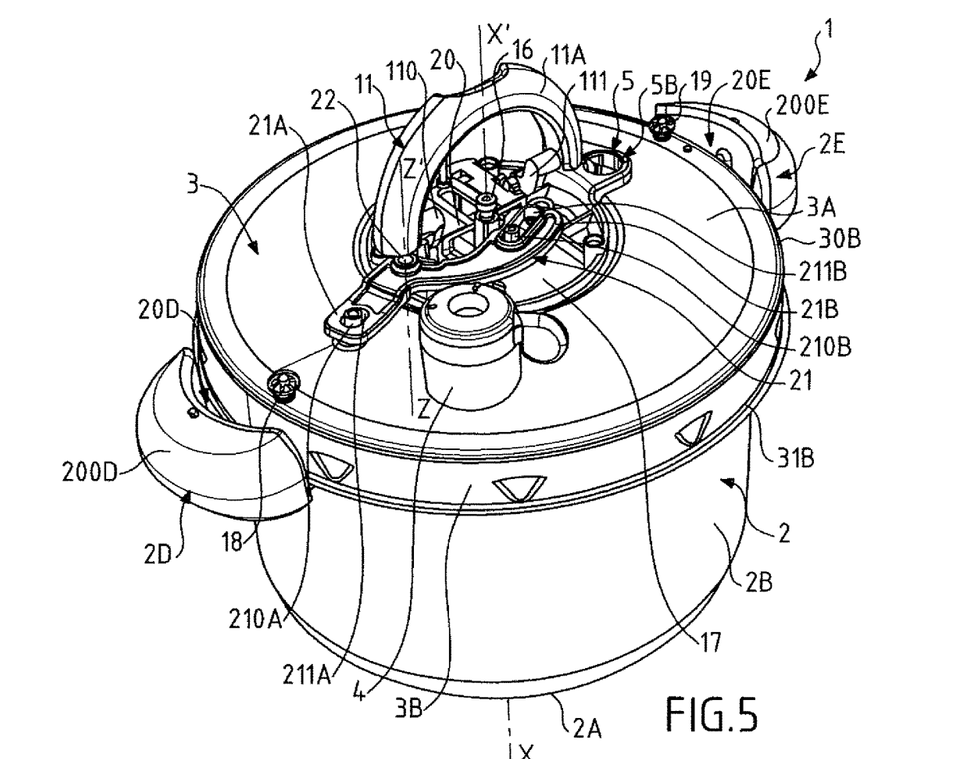
FIG. 5 shows the pressure cooker of FIGS. 1 to 4, the support not being shown in order to make it possible to see a movement-transformation device for transforming the manual movement of the control member into pivoting of the lid relative to the support.

The utensil 1 also advantageously includes a control member 11 for controlling the locking/unlocking, which control member is designed, in this example, to be capable of being manipulated by the user in such a manner as to enable the user to control the bayonet-fitting locking system in order thus to cause the utensil 1 to go from its pre-locking configuration (also referred to as the "ready-for-locking" configuration—shown in FIG. 1) to its locking configuration (shown in FIG. 16), and vice versa, by turning the lid 3 relative to the support 10 and to the vessel 2. The control member 11 is attached to the support 10, permanently in this example, in such a manner as to be capable of being moved manually relative to said support between a locking position (FIG. 16) and an unlocking position (FIG. 1). In other words, the control member 11 is advantageously fastened permanently to the support 10 while also retaining the possibility of moving relative to said support, so that a user can manually cause the control member 11 to move relative to the support 10 from the unlocking position to the locking position and vice versa.

The utensil 1 advantageously includes a transformation device for transforming said movement of the control member 11 into pivoting of the lid 3 relative to the support 10. The transformation device, which can be seen, in particular, in FIGS. 5, 9 to 13, 18, 20, and 21, is thus designed to convert the movement of the control member 11 relative to the support 10 into movement in rotation of the lid 3 relative to said support 10, in this example about said central vertical axis X-X', so that the user can thus cause the locking/unlocking to take place by causing the lid 3 to pivot relative to the support 10 merely by manipulating the control member 11, once the lid 3 has been mounted on the vessel 2 in said predetermined relative arrangement (in which the lid ramps are disposed below the vessel ramps). Naturally, the above-mentioned transformation device is designed as a function of the type of movement of the control member 11 relative to the support 10 and can implement any required drive component (toothed wheel, cam, lever, connection rod, etc.).

Implementing a control member 11 incorporated in the support 10 and mounted to move relative to said support is however entirely optional. For example, it is quite possible, without going beyond the ambit of the invention, for the control member 11 to be formed merely by a handle fastened directly to the lid 3 and distinct from the support 10, in which case implementing a transformation device is unnecessary.

The use of a control member 11 incorporated in the support 10 and mounted to move relative to said support is, however, preferred because it makes the utensil 1 easier to use. In which case, the invention is absolutely not limited to implementing a specific mechanical coupling interconnecting the control member 11 and the support 10. The control member 11 may thus be mounted to pivot and/or to move in translation relative to the support 10 by any appropriate means. For example, the control member 11 may be mounted to move in rotation only, about an axis of rotation that extends in a direction intersecting the direction of the central vertical axis X-X', and even more preferably about an axis of rotation intersecting the central vertical axis X-X', or alternatively, said control member 11 may be mounted to move in translation relative to the support 10, e.g. to slide vertically (preferably along an axis of sliding that coincides with the central vertical axis X-X') relative to said support 10, or indeed be connected to the support 10 via a mechanical coupling combining a movement in translation and a movement in rotation (e.g. a helical coupling of axis X-X'). The control member 11 may thus be in the form of a rotary element of the handle or knob, lever, control stick, looped handle or other type and/or in the form of a slidably mounted element such as a push button, a slider, etc. In the preferred embodiment shown in the figures, the control member 11 is mounted to pivot relative to said support 10 about a radial axis of pivoting Y-Y' that is perpendicular to the central vertical axis X-X', and that intersects said central vertical axis. Such a pivot coupling for pivoting about a radial axis causes the control member 11 to move relative to the support 10 in a movement that is formed by a movement in rotation only, about an axis Y-Y' that is perpendicular to the axis of pivoting X-X' of the lid 3 relative to the support 10, thereby avoiding any untimely turning of the vessel 2. Such a movement in rotation is also particularly ergonomic and intuitive. In the preferred example shown in the figures, each handle 2D, 2E equipping the vessel 2 extends outwards from said vessel 2 in a radial direction that is substantially parallel to said radial axis Y-Y' of said pivot coupling interconnecting the control member 11 and the support 10. Such a configuration, in which the vessel handles 2D, 2E are aligned with the axis of rotation Y-Y' of the control member 11 relative to the support 10 is particularly practical and ergonomic. However, it is quite possible, without going beyond the ambit of the invention, for the mechanical coupling between the control member 11 and the support 10 to be a pivot coupling of radial axis that is perpendicular both to the central vertical axis X-X' and to the radial direction in which said vessel handles 2D, 2E extend.

Advantageously, said transformation device includes a gearing mechanism designed to drive the lid 3 in rotation about said central vertical axis X-X' over a stroke having a first predetermined angular amplitude α, in response to said control member 11 being moved in rotation about said radial axis Y-Y' over a stroke having a second predetermined angular amplitude β that is greater than said first predetermined angular amplitude α. For example, the control member 11 is designed to pivot about said radial axis Y-Y' between a raised position (corresponding to unlocking) and a folded-away position (corresponding to locking) that are separated by a stroke having a predetermined angular amplitude β of about 90°, while, in response to the control member 11 moving relative to the support 10 though an angle of about 90°, the lid 3 pivots relative to the support 10 over a stroke having a predetermined angular amplitude α of about 15°. Such a gearing mechanism thus makes it possible to differentiate clearly between the positions of the control member 11 that correspond respectively to locking and to unlocking, and to reduce the forces exerted by the user for causing the cooking utensil 1 to go from its ready-for-locking configuration to its locked configuration. Naturally, a multitude of technical possibilities exist for obtaining such a gearing effect, and the invention is not limited to any particular gearing mechanism, nor indeed to having such a gearing mechanism. In an embodiment shown in the figures, the transformation device includes a transmission part 20 mounted to move in translation in a horizontal plane perpendicular to said central vertical axis X-X' relative to said support 10. The transmission part 20 is thus mounted to slide relative to the support 10, e.g. inside the housing provided between the plate 17 and the central portion 100 that fits over said plate 17. In this embodiment, the transformation device comprises a mechanism for transforming the pivoting movement of the control member 11 relative to the support 10 into a movement in translation of said transformation part 20 relative to said support 10. For example, the transformation mechanism in question is formed by a cam 110, 111 integral with or secured to the control member 11, said cam 110, 111 being provided with a stud that is received in a corresponding recess provided in the transmission part 20, in such a manner that pivoting of the control member 11 causes concomitant pivoting of the cam 110, 111, which then pushes back the transmission part 20 in the horizontal plane perpendicular to the central vertical axis X-X'. Advantageously, and in the embodiment shown in the figures, the transformation device further comprises at least one horizontal lever 21 mounted to pivot relative to the support 10 about an off-center vertical axis Z-Z' that is stationary relative to said support 10, that is parallel to said central vertical axis X-X', and that is situated at a predetermined distance from said central vertical axis. Preferably, as shown in the figures, said horizontal lever 21 extends longitudinally between a first end 21A hinged to the lid 3 and a second end 21B hinged either to said control member 11 or to a transmission part (such as, for example, the above-mentioned transmission part 20) that is part of the transformation device and that is caused to move relative to the support 10 by the control member 11, e.g. as in the above-described embodiment. Preferably, the horizontal lever 21 is provided with a recess (e.g. formed by a through orifice) designed to receive a pin 22 integral with or secured to the support 10, and, for example, formed integrally with the plate 17, in such a manner as to form a pivot coupling of axis Z-Z' between the horizontal lever 21 and the support 10. Preferably, said horizontal lever 21 is mounted to pivot relative to the support 10 at a pivot point situated between said first end 21A and said second end 21B, so that the off-center vertical axis Z-Z' goes via a zone of the horizontal lever 21 that is situated at some distance both from the first end 21A and from the second end 21B. The hinging of the first end 21A relative to the lid 3 is achieved, for example, by means of a first peg 210A that is integral with or secured to the lid 3, and is, for example, welded to the outside face of said lid 3 in such a manner as to extend vertically upwards from said lid. Said peg 210A is advantageously received in a first corresponding groove 211A provided at the first end 21A of the horizontal lever 21, in such a manner that said first peg 210A can both slide and turn in the first groove 211A in question. The transformation device also advantageously includes a second peg 210B that, in this example, is integral with or secured to the transmission part 20 and is incorporated therein. Said second peg 210B is advantageously received in a complementary second groove 211B provided at the second end 21B of the horizontal lever 21, in such a manner that said second peg 210B can both slide and pivot in the second groove 211B in question. Advantageously, the horizontal lever 21 is generally sickle-shaped, with a substantially rectilinear arm that extends from the first end 21A to the point of rotation through which the off-center vertical axis Z-Z' passes, so as then to be extended by an arcuate portion to the second end 21B. The rectilinear movement in translation of the transmission part 20 in the horizontal plane is converted into movement in rotation of the lever 21 about the off-center vertical axis Z-Z', which movement in rotation is itself converted into movement in rotation of the lid 3 relative to the support 10 about the central vertical axis X-X'. However, the invention is absolutely not limited to such a movement transformation mechanism and, for example, it is quite possible, instead of a lever system as shown, to implement a system having a connection rod, a cam, or meshing inter-engagement, or any other known system, without going beyond the ambit of the invention.

Advantageously, and as shown in the figures, the control member 11 comprises a looped handle 11A designed to be actuated manually so as to be movable by hand by a user between two preferably stable abutment positions, corresponding respectively to locking and to unlocking. In this preferred embodiment, the control member 11 is thus in the form of an arcuate part, in the form of a loop or of an arch, advantageously designed to be suitable for being grasped firmly by a user, preferably using the whole hand to grasp it. However, the invention is not limited to implementing a looped handle 11A for forming the control member 11, and said control member may, for example, be constituted by a lever that is substantially rectilinear, or that has a T-shaped or L-shaped profile, a rounded knob shape, a flared knob shape, etc. the shaping of which enables the user to lift the lid subassembly via it. The control member 11 is advantageously designed so that it can be moved manually (be it in rotation and/or in translation) relative to the support 10 both in a locking direction and in an opposite unlocking direction. Thus, in this preferred embodiment, the cooking utensil 1 has a single control member 11 that enables a user to cause the lid 3 to pivot relative to the support 10 both in the clockwise direction S1 and in the counterclockwise direction S2. In which case, the above-mentioned movement transformation device is designed to transform the manual movement of the control member 11, respectively in the locking direction and in the unlocking direction, into pivoting of the lid 3 relative to the support 10 about said central vertical axis X-X' in respective opposite rotation directions. Advantageously, as shown in the figures, the control member 11 is mounted to pivot relative to said support 10 between firstly a deployed position (FIG. 1) corresponding to the lid 3 being unlocked, and in which said control member 11 projects vertically, in this example in register with the lid 3 and outwardly, and secondly a retracted position, which forms said locking position and in which said control member 11 is lowered towards the lid 3. In its deployed position, the control member 11 advantageously extends in a mean direction that is substantially parallel to said central vertical axis X-X', while, in its retracted position, it extends advantageously in a mean direction that is substantially perpendicular to said central vertical axis X-X', as shown in the figures. In this preferred embodiment, the control member 11 is thus retractable, enabling it to be stowed away when it is in its retracted position.

Preferably, the utensil 1 has a graspable member for enabling the lid 3 to be taken hold of, which member is attached to the lid 3 and is designed to be taken hold of manually in order to enable the lid 3 to be manipulated and transported via it, with a view, for example, to lifting the lid 3 so as to mount it on the vessel 2 in the predetermined relative arrangement. In which case, advantageously, the graspable member is formed by the control member 11 in the deployed position. When the control member 11 is formed by a looped handle 11A, the lid 3 advantageously has relief 23 in its surface, the shape of the relief preferably being substantially complementary to the shape of the empty space that is delimited by said looped handle 11A and that is designed to receive the fingers of the user. In other words, the relief 23 is designed to at least partially fill the internal empty space delimited by the looped handle 11A when said handle is folded away against the lid 3. Thus, when the looped handle 11A is fully folded away against the lid 3, parallel thereto (control member 11 in the retracted position), it advantageously extends in continuity with the relief 23, thereby limiting the possibility of the user taking hold of the looped handle 11A for manipulating (i.e. lifting, transporting, etc.) the cooking utensil 1.

Preferably, under the effect of the level of pressure prevailing in the cooking enclosure, the above-mentioned opening safety means 5 are suitable for going between a releasing configuration, in which they allow the lid 3 to be unlocked relative to the vessel 2, and a blocking position in which they prevent the lid 3 from being unlocked relative to the vessel 2. To this end, said safety means 5 include a moving element 5A mounted to slide on the lid 3, and, in this example, to slide vertically in a direction of sliding that is parallel to the central vertical axis X-X', between a high position (which is an abutment position) in which it is capable of co-operating with a complementary blocking element 5B carried by the support 10, in order to prevent the lid 3 from pivoting relative to the support 10, and a low position (which is also an abutment position) in which it does not interfere with the complementary element 5B, thereby allowing the lid 3 to pivot relative to the support 10. As can be seen, in particular in FIG. 12, the moving element 5A is advantageously formed by a finger designed to slide vertically inside a tube that is butt-bonded to a leakage orifice provided through the lid 3, so that, in its high position, the finger comes to close off the leakage orifice hermetically, whereas, when the finger is in its low position, steam is allowed to leak via the orifice in question. The complementary element 5B is preferably formed by a part having a stop surface 50B and a through orifice 51B. So long as the lid is in its position in which it is unlocked relative to the support 10, the blocking surface 50B is in register with the moving element 5A, in the path along which said moving element slides, in order to prevent it from reaching its high position and thus in order to maintain communication between the inside of the cooking enclosure and the outside, preventing any significant build-up of pressure in the enclosure. Conversely, when the lid 3 reaches its locking position, by pivoting relative to the support 10 over the abovementioned predetermined angular stroke, the moving element 5A is then in register with the opening 51B, thereby allowing the moving element 5A to reach its sealing high position under the effect of the drive force exerted by the pressure building up inside the cooking enclosure. Once in the high position, the moving element 5A is surrounded by the edges of the orifice 51B, thereby preventing any pivoting of the lid 3 relative to the support 10 in the unlocking direction.

Operation of the cooking utensil 1 shown in the figures is described briefly below. The user firstly fills the vessel 2 shown in FIG. 2 with food for cooking, optionally placing the food some distance from the bottom of the vessel 2 in a cooking basket having gaps in it. The user then takes hold of the lid subassembly shown in FIG. 4 via the looped handle 11A so as to lift said lid subassembly with a view to mounting it on the vessel 2 in said predetermined relative arrangement. For this purpose, the user positions the dropped edges 10A, 10B in the corresponding recesses 20D, 20E provided by the vessel handles 2D, 2E, the shape of said dropped edges 10A, 10B advantageously being substantially complementary to the shape of the recesses 20D, 20E provided by the vessel handles 2D, 2E. The lid 3 thus comes to fit over the top of the top edge 2C of the vessel 2, thereby interfittingly engaging the ribs forming the second positioning elements 14, 15 into the corresponding notches forming the positioning elements 12, 13, thereby locking the relative angular positioning of the support 10 and of the vessel 2, in a horizontal plane perpendicular to the central vertical axis X-X'. In this predetermined relative arrangement of the support 10 and of the vessel 2, the support 10 is extended substantially radially outwards by a portion (graspable portion 200D, 200E) of the vessel handle 2D, 2E, as can be seen, in particular, in FIGS. 1 and 3. The utensil 1 is then in a ready-for-locking configuration, from which it is possible, merely by turning the lid 3 relative to the vessel 2, to lock the lid 3 relative to the vessel 2. For this purpose, the user folds away the looped handle 11A over an angular stroke β of about 90°, until it reaches an abutment folded-away position shown, in particular, in FIGS. 16 and 17. This manual movement of the looped handle 11A from its deployed position to its folded-away position concomitantly causes the lid 3 to pivot relative to the support 10 through an angle α of about 15°, thereby enabling the lid ramps to come into correspondence under the vessel ramps in a locking configuration enabling pressure to build up. At the end of the cooking cycle, and once the pressure prevailing inside the enclosure has fallen to a predetermined safety level, the user merely needs to raise the looped handle 11A in order to cause the lid 3 to pivot relative to the support 10 in the opposite direction, thereby disengaging the vessel ramps from the lid ramps, enabling the lid 3 to be separated from the vessel 2.

The invention claimed is:

1. A cooking utensil for cooking food under pressure, comprising:
    a vessel with a handle;
    a lid independent of the vessel;
    a bayonet-fitting locking system;
    a support attached to said lid, wherein said lid can pivot relative to said support, the support and the vessel being configured to be united in at least one predetermined relative arrangement enabling said bayonet-fitting locking system to lock the lid to the vessel by the lid pivoting relative to the support about a central vertical axis (X-X'), said lid and said support forming a lid subassembly that rests freely against the vessel when said support and said vessel are united in said predetermined relative arrangement, said support forming a first positioning element that projects radially beyond the lid and that is configured such that, when the support and the vessel are united in said predetermined relative arrangement, said first positioning element interacts mechanically with a complementary second positioning element that is integral with or secured to said handle to lock the relative angular positioning of the support and of the vessel in a horizontal plane that is perpendicular to said central vertical axis (X-X'), while also allowing said handle to project radially outwards beyond said support; and,
a control member for controlling locking/unlocking, which control member is attached to said support in such a manner as to be capable of being moved manually relative to said support between locking and unlocking positions; and,
a transformation device for transforming said manual movement of the control member into pivoting of the lid relative to the support.

2. The cooking utensil according to claim 1, wherein said handle is shaped to provide a recess configured to receive said first positioning element.

3. The cooking utensil according to claim 1, wherein said handle comprises:
a graspable portion that is shaped to be taken hold of manually in order to enable the vessel to be manipulated, and
a fastening portion that interconnects said vessel and said graspable portion.

4. The cooking utensil according to claim 2, wherein said recess is delimited by said graspable portion.

5. The cooking utensil according to claim 3, wherein said graspable portion and said second positioning element are separated from the vessel in the radial direction (X-X'), respectively by a first spacing and by a second spacing that is less than said first spacing.

6. The cooking utensil according to claim 3, wherein said mechanical interaction of said first positioning element with said second positioning element is a male/female co-operation.

7. The cooking utensil according to claim 6, wherein said first and second positioning elements respectively have a male shaped portion and a female shaped portion that are complementary to each other.

8. The cooking utensil according to claim 1, wherein said support comprises a top portion that is mounted above the lid and that projects radially beyond said lid so as to be extended by a vertical dropped edge that forms said first positioning element.

9. The cooking utensil according to claim 7, wherein said female shaped portion is formed by a notch provided in said vertical dropped edge, while said male shaped portion is formed by a rib carried by the handle.

10. The cooking utensil according to claim 1,
wherein said lid subassembly comprises a sealing gasket carried by the lid and configured to be interposed between the lid and the vessel,
wherein said support and said vessel are configured so that, when said support and said vessel are united in said predetermined relative arrangement, said lid subassembly rests and bears directly against the vessel in such a manner as to maintain a vertical spacing between the support and the handle so that said support does not bear vertically on said handle.

11. The cooking utensil according to claim 1, wherein said control member is mounted to pivot relative to said support about a radial axis of pivoting (Y-Y') that is perpendicular to said central vertical axis (X-X').

12. The cooking utensil according to claim 11, wherein said handle extends outwardly from said vessel in a radial direction that is substantially parallel to said radial axis of pivoting (Y-Y').

13. The cooking utensil according to claim 11, wherein said control member is mounted to pivot relative to said support between a deployed position corresponding to the lid being unlocked and in which said control member projects vertically, and a retracted position corresponding to the lid being locked and in which said control member is lowered towards the lid.

14. The cooking utensil according to claim 13, further comprising:
a graspable member for enabling the lid to be taken hold of, which graspable member is attached to the lid and is configured to be taken hold of manually in order to enable the lid to be manipulated and transported, said graspable member being formed solely by said control member in the deployed position.

15. The cooking utensil according to claim 13, wherein in the deployed position, said control member extends in a mean direction that is substantially parallel to said central vertical axis (X-X'), whereas in the retracted position, said control member extends in a mean direction that is substantially perpendicular to said central vertical axis (X-X').

16. The cooking utensil according to claim 1, wherein said control member comprises a looped handle.

17. The cooking according to claim 1, further comprising:
an opening safety means that, under the effect of the level of pressure prevailing in the cooking utensil, are suitable for going between a releasing configuration, in which said opening safety means allow the lid to be unlocked relative to the vessel, and a blocking position in which said opening safety means prevent the lid from being unlocked relative to the vessel, said safety means comprising a moving element mounted to slide on the lid between a high position in which said moving element is capable of co-operating with a complementary blocking element carried by the support in order to prevent the lid from pivoting relative to the support, and a low position in which said moving element does not interfere with the complementary element, thereby allowing the lid to pivot relative to the support.

18. The cooking utensil according to claim 1, wherein the cooking utensil is configured to be subjected to an external heat source, wherein the heat source is a hotplate or ring.

* * * * *